（12) United States Patent
Zhang et al.

(10) Patent No.: US 8,836,242 B2
(45) Date of Patent: Sep. 16, 2014

(54) LED VOLTAGE ADJUSTMENT DEVICE AND DRIVE SYSTEM THEREOF

(71) Applicant: Shenzhen China Star Optoelectronics Technology Co., Ltd., Guangdong (CN)

(72) Inventors: Xianming Zhang, Shenzhen (CN); Xiang Yang, Shenzhen (CN)

(73) Assignee: Shenzhen China Star Optoelectronics Technology, Co., Ltd., Shenzhen, Guangdong (CN)

( * ) Notice: Subject to any disclaimer, the term of this patent is extended or adjusted under 35 U.S.C. 154(b) by 105 days.

(21) Appl. No.: 13/807,008

(22) PCT Filed: Dec. 5, 2012

(86) PCT No.: PCT/CN2012/085973
§ 371 (c)(1),
(2), (4) Date: Dec. 26, 2012

(87) PCT Pub. No.: WO2014/082324
PCT Pub. Date: Jun. 5, 2014

(65) Prior Publication Data
US 2014/0145646 A1    May 29, 2014

(30) Foreign Application Priority Data
Nov. 29, 2012  (CN) .......................... 2012 1 0499422

(51) Int. Cl.
*H05B 37/02* (2006.01)
*G05F 1/40* (2006.01)
*H02J 4/00* (2006.01)
*H05B 33/08* (2006.01)

(52) U.S. Cl.
CPC ................................ *H05B 33/0815* (2013.01)
USPC .............. 315/307; 315/192; 307/11; 323/282

(58) Field of Classification Search
CPC .................................. H05B 37/02; H02J 4/00
USPC ....................... 315/192, 307; 323/282; 307/11
See application file for complete search history.

(56) References Cited

U.S. PATENT DOCUMENTS

| 8,664,883 | B2 * | 3/2014 | Hiramatu et al. | 315/291 |
| 8,686,667 | B2 * | 4/2014 | Mishima et al. | 315/307 |
| 2006/0043951 | A1 * | 3/2006 | Oswald et al. | 323/282 |
| 2012/0250381 | A1 * | 10/2012 | Takahashi | 363/124 |
| 2012/0262082 | A1 * | 10/2012 | Esaki et al. | 315/224 |
| 2013/0162152 | A1 * | 6/2013 | Lee et al. | 315/192 |
| 2013/0293109 | A1 * | 11/2013 | Cheon et al. | 315/122 |

* cited by examiner

*Primary Examiner* — Douglas W Owens
*Assistant Examiner* — Wei Chan
(74) *Attorney, Agent, or Firm* — Andrew C. Cheng

(57) ABSTRACT

The present invention provides LED voltage adjustment device and drive system thereof. The device includes PI regulator, with negative terminal connected to negative terminal of LED light bar to receive negative terminal voltage of light bar and positive terminal of PI regulator being for receiving reference voltage; integrator, for performing integral on output signal of PI regulator; a subtractor, with positive input terminal receiving output signal from PI regulator and negative terminal receiving overcurrent protection detection voltage from boost converter for driving light bar, and subtracting overcurrent protection detection voltage from output signal of PI regulator; comparator, with positive terminal receiving output signal from integrator and negative terminal receiving output signal from subtractor; and integrated circuit (IC) module, for receiving output signal from comparator and based on received output signal to control a control signal to conduct or cut off switch transistor of boost converter.

14 Claims, 2 Drawing Sheets

LED VOLTAGE ADJUSTMENT DEVICE AND DRIVE SYSTEM THEREOF

BACKGROUND OF THE INVENTION

1. Field of the Invention

The present invention relates to the field of LED voltage adjusting techniques, and in particular to a device based on adjusting voltage of negative terminal of the LED light bar imposed on the light bar and drive system for the device.

2. The Related Arts

Liquid crystal display device (LCD) has been widely applied in many electronic devices. Currently, the majority of the LCDs is the back-lit type LCD. The back-lit LCD comprises liquid crystal panel and backlight module. In general, the backlight module can be categorized as direct-lit and edge-lit. The backlight module can provide light source to the liquid crystal panel.

Because LED has the advantages of low power consumption, low heat generation, long life span, small size, fast response and visible light of stable wavelength, LED is suitable for acting as the backlight module for the LCD.

To meet the demands of the ultra-thin LCD-TV, most backlight modules use edge-lit. In LED backlight module, the light bar is the key component. A plurality of LEDs arranged regularly on a stripe base forms a light bar. The known light bars are usually disposed symmetrically on the top and bottom sides or left and right sides of the LCD. However, the light bars can also be disposed on all four sides. In general, a boost converter can be used to drive the light bar. As such, the negative terminal voltage of the light bar can stays at high level.

SUMMARY OF THE INVENTION

According to an aspect of the present invention, the present invention provides an LED voltage adjustment device, which comprises: a PI regulator, with negative terminal connected to the negative terminal of the LED light bar to receive negative terminal voltage of the light bar and positive terminal of the PI regulator being for receiving reference voltage; an integrator, for performing integral on the output signal of PI regulator; a subtractor, with positive input terminal receiving output signal from PI regulator and negative terminal receiving overcurrent protection detection voltage from the boost converter for driving the light bar, and for subtracting the overcurrent protection detection voltage from the output signal of the PI regulator; a comparator, with positive terminal receiving output signal from the integrator and negative terminal receiving output signal from the subtractor; and an integrated circuit (IC) module, for receiving output signal from the comparator and based on the received output signal to control a control signal to conduct or cut off a switch transistor of the boost converter.

According to a preferred embodiment of the present invention, the IC module is an RS trigger.

According to a preferred embodiment of the present invention, the LED voltage adjustment device further comprises: a clock module, for generating clock signal outputted to the S terminal of the RS trigger and the clock terminal of the integrator, wherein the R terminal of the RD trigger receives the output signal from the comparator.

According to a preferred embodiment of the present invention, when the clock signal is high, the control signal outputted by the RS trigger is high.

According to a preferred embodiment of the present invention, when the clock signal is high, the integrator starts to perform integral on the output signal of the PI regulator.

According to a preferred embodiment of the present invention, when the output signal of the integrator becomes larger than or equal to the output signal of the subtractor, the output signal of the comparator received by the R terminal of the RS trigger is high, and the control signal outputted by the RS trigger is low.

According to a preferred embodiment of the present invention, the reset terminal of the integrator is connected to the output terminal of the comparator, wherein the output signal of the comparator resets the integrator and the integrator stops working until the clock signal becomes high again.

According to another aspect of the present invention the present invention provides a drive system for LED light bar, which comprises: a boost converter, with output terminal connected to the positive terminal of the light bar; an LED voltage adjustment device, which comprising: a PI regulator, with negative terminal connected to the negative terminal of the LED light bar to receive negative terminal voltage of the light bar and positive terminal of the PI regulator being for receiving reference voltage; an integrator, for performing integral on the output signal of PI regulator; a subtractor, with positive input terminal receiving output signal from PI regulator and negative terminal receiving overcurrent protection detection voltage from the boost converter for driving the light bar, and for subtracting the overcurrent protection detection voltage from the output signal of the PI regulator; a comparator, with positive terminal receiving output signal from the integrator and negative terminal receiving output signal from the subtractor; and an integrated circuit (IC) module, for receiving output signal from the comparator and based on the received output signal to control a control signal to conduct or cut off a switch transistor of the boost converter.

According to a preferred embodiment of the present invention, the IC module is an RS trigger.

According to a preferred embodiment of the present invention, the LED voltage adjustment device further comprises: a clock module, for generating clock signal outputted to the S terminal of the RS trigger and the clock terminal of the integrator, wherein the R terminal of the RD trigger receives the output signal from the comparator.

According to a preferred embodiment of the present invention, when the clock signal is high, the control signal outputted by the RS trigger is high.

According to a preferred embodiment of the present invention, when the clock signal is high, the integrator starts to perform integral on the output signal of the PI regulator.

According to a preferred embodiment of the present invention, when the output signal of the integrator becomes larger than or equal to the output signal of the subtractor, the output signal of the comparator received by the R terminal of the RS trigger is high, and the control signal outputted by the RS trigger is low.

According to a preferred embodiment of the present invention, the reset terminal of the integrator is connected to the output terminal of the comparator, wherein the output signal of the comparator resets the integrator and the integrator stops working until the clock signal becomes high again.

According to the embodiments, the present invention can avoid imposing the negative terminal voltage directly to the IC circuit to cause the high voltage penetrating the IC, make the average variation of the number of switches in each switch period strictly equal to or proportional to the control reference, and avoid the overheat problem caused by large voltage difference.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

For description of the technical means and result of the present invention, the following refers to the drawings and embodiments for detailed description, wherein the same number indicates the same part.

Figure 1:
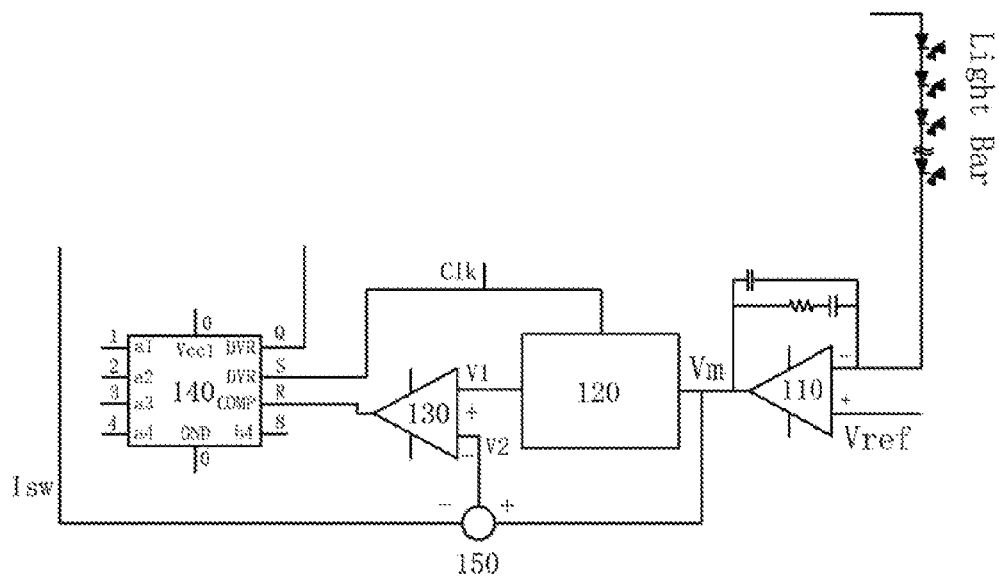
FIG. 1 is a block diagram of the LED voltage adjustment device of an embodiment of the present invention.
Figure 2:
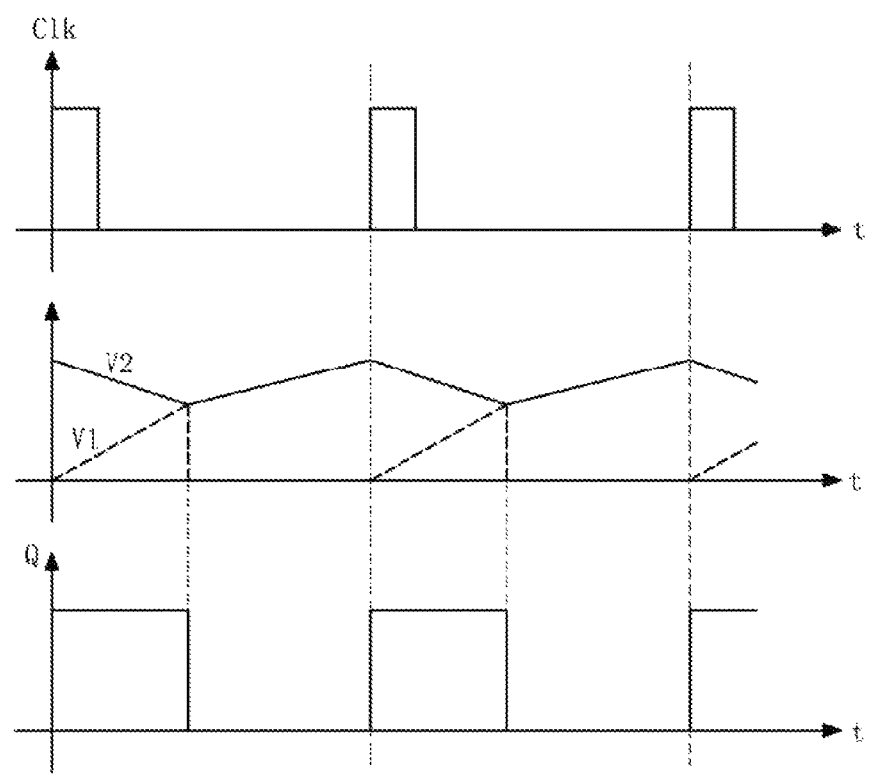
FIG. 2 is an operational waveform of the LED voltage adjustment device of an embodiment of the present invention.

FIG. 1 is a block diagram of the LED voltage adjustment device of an embodiment of the present invention; FIG. 2 is an operational waveform of the LED voltage adjustment device of an embodiment of the present invention; and FIG. 3 is a circuit diagram of the drive system for LED light bar comprising the LED voltage adjustment device of an embodiment of the present invention.

Figure 3:
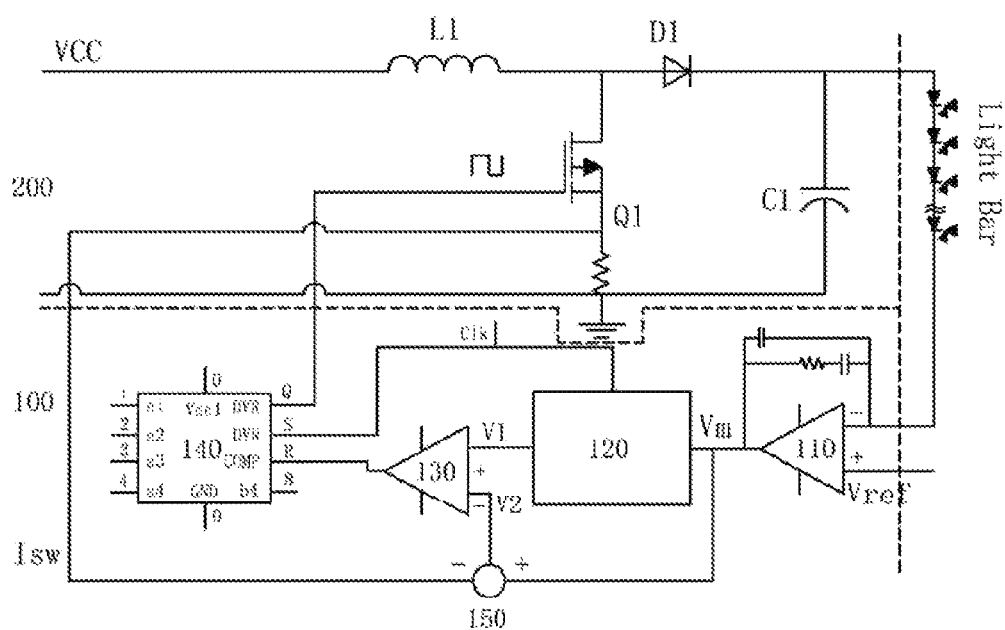
FIG. 3 is a circuit diagram of the drive system for LED light bar comprising the LED voltage adjustment device of an embodiment of the present invention.

Referring to FIGS. 1-3, the LED voltage adjustment device according to the present invention comprises: a PI regulator 110, an integrator 120, a comparator 130, an IC module 140 and a subtractor 150. Specifically, the negative terminal of the PI regulator 110 is connected to the negative terminal of the LED light bar to receive negative terminal voltage of the light bar. The positive terminal the PI regulator is for receiving reference voltage Vref. In general, Vref is a constant voltage larger than the negative terminal voltage of the light bar. The output terminal of the PI regulator 110 is connected to the input terminal of the integrator 120 so that the integrator 120 can perform integral on the output signal Vm of PI regulator 110. The output terminal of the integrator 120 is connected to the positive input terminal of the comparator 130. In addition, the positive input terminal of the subtractor 150 is connected to the output terminal of the PI regulator 110, and the negative terminal receives an overcurrent protection detection voltage Isw from the boost converter. A first input terminal of the IC module 140 is connected to the output terminal of the comparator 130, and a second input terminal of IC module 140 receives a clock signal Clk generated by a clock module (not shown). On the other hand, the clock terminal of the integrator 120 also receives the clock signal Clk generated by a clock module. Based on the received comparison result from the comparator 130, the IC module 140 outputs a control signal to the gate terminal of the switch transistor Q1 in the boost converter so that the switch transistor Q1 can conduct or cut off accordingly. As such, the LED voltage adjustment device of the present invention can adjust the duty cycle of the switch transistor Q1 in the boost converter so as to adjust the voltage imposed on the light bar based on the negative terminal voltage of the light bar.

The following refers to FIGS. 1-3 to describe the operation of the LED voltage adjustment device of the present invention.

According to the embodiments of the present invention, the IC module 140 can be an RS trigger. The first input terminal of the IC module 140 is R terminal and the second input terminal is S terminal. When the clock module (not shown) generates a high clock signal, the S terminal of the RS trigger 140 is high ("1") so that the output terminal Q of the RS trigger 140 is also high, leading to the conductivity of switch transistor Q1. At this point, the integrator 120 receiving the clock signal from the clock module also starts to work. Because the proportional integral function of the PI regulator 110, the output of the PI regulator 110 will be relatively smaller when the difference between the light bar negative terminal voltage and the reference voltage Vref is smaller (i.e., the light bar negative terminal voltage approximating the reference voltage Vref), and the output of the PI regulator 110 will be relatively larger when the difference between the light bar negative terminal voltage and the reference voltage Vref is larger. The integrator 120 performs integral on the output signal Vm of the PI regulator 110. At this point, the output signal V1 of the integrator 120 starts to increase from 0. However, the V2 obtained by subtracting the overcurrent protection detection voltage Isw from the Vm will be greater than V1. In the mean time, because Q1 is in conductive state, V2 will gradually decrease. When V1 is less than V2, the comparator 130 will output a low ("0"). Because the R terminal of the RS trigger 140 is low ("0"), the output terminal Q of the RS trigger 140 will stay in the previous state. In other words, the output terminal Q of the RS trigger 140 will stay at high so that the switch transistor Q1 remains conductive.

Then, as V1 increases and V2 decreases, when V1 becomes larger than or equal to V2, the comparator 130 outputs a high signal ("1"). At this point, the clock signal becomes low. In such circumstance, because the R terminal of the RS trigger 140 is high ("1"), the output terminal Q of the RS trigger 140 will be flipped. In other words, the output terminal Q of the RS trigger 140 will become low so that the switch transistor Q1 become cut off. Because the reset terminal of the integrator 120 is connected to the output terminal of the comparator 130, when the output of the comparator 130 becomes high ('1"), the integrator 120 is reset and stops working until the clock signal becomes high again. Because Q1 is cut off, the overcurrent protection detection voltage Isw becomes 0, and the output V1 of the integrator 120 also becomes 0, V2 will be larger than V1. At this point, the comparator 130 will output low ("0"). Because the R terminal of the RS trigger 140 is low ("0"), the output terminal Q of the RS trigger 140 will stay in the previous state. In other words, the output terminal Q of the RS trigger 140 will stay at low so that the switch transistor Q1 remains cut off.

As aforementioned, the output Vm of the PI regulator 110 will be relatively smaller when the difference between the light bar negative terminal voltage and the reference voltage Vref is smaller (i.e., the light bar negative terminal voltage approximating the reference voltage Vref), and the output Vm of the PI regulator 110 will be relatively larger when the difference between the light bar negative terminal voltage and the reference voltage Vref is larger. Therefore, when the difference between the light bar negative terminal voltage and the reference voltage Vref is smaller (i.e., Vm is smaller), V1 will increase to become equal to V2 during a short duration, and thus the conductive time for the switch transistor Q1 is shorter (smaller duty cycle). This means that when the light bar negative terminal voltage is lower, the voltage imposed on the light bar will be larger because the conductive time for the switch transistor Q1 is shorter. On the other hand, when the difference between the light bar negative terminal voltage and the reference voltage Vref is largerr (i.e., Vm is larger), V1 will increase to become equal to V2 after a long duration, and thus the conductive time for the switch transistor Q1 is longer. This means that when the light bar negative terminal voltage is higher, the voltage imposed on the light bar will be smaller because the conductive time for the switch transistor Q1 is longer (larger duty cycle). As such, the LED voltage adjustment device of the present invention can adjust the duty cycle of the switch transistor Q1 in the boost converter so as to adjust the voltage imposed on the light bar based on the negative terminal voltage of the light bar.

FIG. 2 shows a waveform of the clock signal, positive input terminal signal V1 of comparator 130, negative terminal signal V1 of comparator 130, and the output terminal signal Q of the RS trigger 140 during the operation of the LED voltage adjustment device of the present invention. As shown in FIG. 2, combined with the aforementioned description, when the clock signal is high, the output terminal signal Q of RS trigger 140 is high. At this point, because the operation of the integrator 120, V1 starts to increase gradually. Because Q1 is in conductive state, V2 starts to decrease gradually. During the increasing of V1 and decreasing of V2, even when the clock signal becomes low, the comparator 130 will output a low signal ("0") because V1 is less than V2. Under such circumstances, the R terminal of the RS trigger 140 is low ("0"), so that the output terminal signal Q of the RS trigger 140 remains in the previous state.

Then, when V1 becomes larger than or equal to V2, the comparator 130 will output a high signal ("1"). In this manner, the R terminal of the RS trigger 140 will become high ("1"), leading to the output terminal signal Q of RS trigger 140 being flipped. In other words, the output terminal signal Q of RS trigger 140 is low ("0"). At this point, the integrator 120 is reset and stops working and the switch transistor Q1 is cut off. Therefore V1 becomes 0 and V2 starts to increase. Then, the comparator 130 will output a low signal ("0") because V1 is less than V2. Under such circumstances, the R terminal of the RS trigger 140 is low ("0"), so that the output terminal signal Q of the RS trigger 140 remains in the previous state.

In the next clock cycle, the LED voltage adjustment device will repeat the above operation.

Referring to FIG. 3, the drive system for light bar comprises an LED voltage adjustment device 100 and a boost converter 200. As shown in FIG. 2, the boost converter 200 comprises an inductor L1, a diode D1, a capacitor C1, a switch transistor Q1 and a detection resistor Rs. The boost converter 200 is a well known LED drive device, and the detailed description will be omitted here. Let Vo be the output voltage of the boost converter (i.e., positive terminal voltage of the light bar), Re be the equivalent resistance of the boost converter 200, Rs be the detection resistor between the switch transistor Q1 and the ground, Ig be the instant current flowing through the switch transistor Q1, d be the duty cycle of the switch transistor Q1 and T be the clock cycle. Each voltage of the LED voltage adjustment device 200 is computed as follows:

$$V1(t) = \frac{1}{T}\int_0^T Vm\,dt$$

$$V2(t) = Vm - Isw$$

-continued $$Isw = ig(t) \times Rs$$

$$Vm = \frac{Vo \times Rs}{Re}$$

$$Vm - ig(t)Rs = Vmd$$

In summary, the present invention can adjust the duty cycle of the switch transistor Q1 in the boost converter based on the light bar negative terminal voltage to avoid imposing the negative terminal voltage directly to the IC circuit to cause the high voltage penetrating the IC. On the other hand, the present invention, through controlling the duty cycle of the switch transistor, makes the average variation of the number of switches in each switch period strictly equal to or proportional to the control reference. In addition, the present invention can also avoid the overheat problem caused by large voltage difference.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. An LED voltage adjustment device, characterized in that wherein the LED voltage adjustment device comprises:
    a PI regulator, with negative terminal connected to the negative terminal of the LED light bar to receive negative terminal voltage of the light bar and positive terminal of the PI regulator for receiving reference voltage;
    an integrator for receiving an output signal of PI regulator;
    a subtractor, with positive input terminal receiving output signal from PI regulator and negative terminal receiving overcurrent protection detection voltage from the boost converter for driving the light bar, and for subtracting the overcurrent protection detection voltage from the output signal of the PI regulator;
    a comparator, with positive terminal receiving output signal from the integrator and negative terminal receiving output signal from the subtractor; and
    an integrated circuit (IC) module, for receiving output signal from the comparator and based on the received output signal to control a control signal to conduct or cut off a switch transistor of the boost converter.

2. The LED voltage adjustment device as claimed in claim 1, characterized in that the IC module is an RS trigger.

3. The LED voltage adjustment device as claimed in claim 2, characterized in that the LED voltage adjustment device further comprises:
    a clock module, for generating clock signal outputted to the S terminal of the RS trigger and the clock terminal of the integrator,
    wherein the R terminal of the RD trigger receives the output signal from the comparator.

4. The LED voltage adjustment device as claimed in claim 3, characterized in that when the clock signal is high, the control signal outputted by the RS trigger is high.

5. The LED voltage adjustment device as claim 4, wherein when the clock signal is high, the integrator receives an output signal of the PI regulator.

6. The LED voltage adjustment device as claimed in claim 5, characterized in that when the output signal of the integrator becomes larger than or equal to the output signal of the subtractor, the output signal of the comparator received by the R terminal of the RS trigger is high, and the control signal outputted by the RS trigger is low.

7. The LED voltage adjustment device as claimed in claim 6, characterized in that the reset terminal of the integrator is connected to the output terminal of the comparator,
wherein the output signal of the comparator resets the integrator and the integrator stops working until the clock signal becomes high again.

8. A drive system for LED light bar, wherein the drive system comprises:
a boost converter, with output terminal connected to the positive terminal of the light bar;
an LED voltage adjustment device, which comprising:
a PI regulator, with negative terminal connected to the negative terminal of the LED light bar to receive negative terminal voltage of the light bar and positive terminal of the PI regulator for receiving reference voltage;
an integrator for receiving an output signal of PI regulator;
a subtractor, with positive input terminal receiving output signal from PI regulator and negative terminal receiving overcurrent protection detection voltage from the boost converter for driving the light bar, and for subtracting the overcurrent protection detection voltage from the output signal of the PI regulator;
a comparator, with positive terminal receiving output signal from the integrator and negative terminal receiving output signal from the subtractor; and
an integrated circuit (IC) module, for receiving output signal from the comparator and based on the received output signal to control a control signal to conduct or cut off a switch transistor of the boost converter.

9. The drive system as claimed in claim 8, characterized in that the IC module is an RS trigger.

10. The drive system as claimed in claim 9, characterized in that the LED voltage adjustment device further comprises:
a clock module, for generating clock signal outputted to the S terminal of the RS trigger and the clock terminal of the integrator,
wherein the R terminal of the RD trigger receives the output signal from the comparator.

11. The drive system as claimed in claim 10, characterized in that when the clock signal is high, the control signal outputted by the RS trigger is high.

12. The drive system as claimed in claim 11, wherein when the output signal is high, the integrator receives an output signal of the PI regulator.

13. The drive system as claimed in claim 12, characterized in that when the output signal of the integrator becomes larger than or equal to the output signal of the subtractor, the output signal of the comparator received by the R terminal of the RS trigger is high, and the control signal outputted by the RS trigger is low.

14. The drive system as claimed in claim 13, characterized in that the reset terminal of the integrator is connected to the output terminal of the comparator,
wherein the output signal of the comparator resets the integrator and the integrator stops working until the clock signal becomes high again.

* * * * *